US011017790B2

(12) United States Patent
Anders et al.

(10) Patent No.: US 11,017,790 B2
(45) Date of Patent: May 25, 2021

(54) AVOIDING SPEECH COLLISIONS AMONG PARTICIPANTS DURING TELECONFERENCES

(71) Applicant: INTERNATIONAL BUSINESS MACHINES CORPORATION, Armonk, NY (US)

(72) Inventors: Kelley Anders, East New Market, MD (US); Jeremy R. Fox, Georgetown, TX (US); Jonathan Dunne, Dungarvan (IE); Liam S. Harpur, Skerries (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 16/205,784

(22) Filed: Nov. 30, 2018

(65) Prior Publication Data

US 2020/0176010 A1 Jun. 4, 2020

(51) Int. Cl.
*G10L 21/0208* (2013.01)
*G10L 21/007* (2013.01)
*G10L 25/63* (2013.01)

(52) U.S. Cl.
CPC ........ *G10L 21/0208* (2013.01); *G10L 21/007* (2013.01); *G10L 25/63* (2013.01); *G10L 2021/02087* (2013.01)

(58) Field of Classification Search
CPC ........................... G10L 21/0208; G10L 21/007
See application file for complete search history.

(56) References Cited

U.S. PATENT DOCUMENTS

| 5,729,694 | A | 3/1998 | Holzrichter et al. |
| 5,765,134 | A * | 6/1998 | Kehoe .................. G10L 21/0208 381/61 |
| 5,933,808 | A | 8/1999 | Kang et al. |
| 7,970,115 | B1 | 6/2011 | Coughlan et al. |
| 8,432,834 | B2 | 4/2013 | Shaffer et al. |
| 9,728,182 | B2 * | 8/2017 | Short ....................... G10L 15/02 |
| 9,866,681 | B2 | 1/2018 | Dickins et al. |
| 2002/0013813 | A1 * | 1/2002 | Matsuoka ............ H04L 12/1813 709/204 |
| 2003/0064352 | A1 * | 4/2003 | Keller .................... G09B 19/00 434/236 |

(Continued)

FOREIGN PATENT DOCUMENTS

WO 2014076129 A1 5/2014

*Primary Examiner* — Jakieda R Jackson
(74) *Attorney, Agent, or Firm* — Cuenot, Forsythe & Kim, LLC

(57) ABSTRACT

A method of avoiding speech collisions among participants during teleconferences includes, during a teleconference, performing, using computer hardware, audio analysis of voices of a plurality of participants of the teleconference, determining, using the computer hardware, an emotive state for each of the plurality of participants during the teleconference, generating, using the computer hardware, a user frequency model for each of the plurality of participants based on the audio analysis and the emotive state, and adjusting, using the computer hardware, frequency of a voice of at least one of the plurality of participants during the teleconference based on the user frequency models of the plurality of participants to avoid a speech collision.

17 Claims, 7 Drawing Sheets

(56) References Cited

U.S. PATENT DOCUMENTS

| | | | | |
|---|---|---|---|---|
| 2004/0013252 A1* | 1/2004 | Craner | | H04M 1/247 |
| | | | | 379/142.01 |
| 2006/0149558 A1 | 7/2006 | Kahn et al. | | |
| 2006/0233347 A1* | 10/2006 | Tong | | G10L 25/00 |
| | | | | 379/265.06 |
| 2007/0071206 A1* | 3/2007 | Gainsboro | | H04M 3/2281 |
| | | | | 379/168 |
| 2008/0037580 A1* | 2/2008 | Shaffer | | G10L 21/028 |
| | | | | 370/465 |
| 2008/0091415 A1* | 4/2008 | Schafer | | G10L 19/0208 |
| | | | | 704/200.1 |
| 2009/0086933 A1* | 4/2009 | Patel | | G10L 17/26 |
| | | | | 379/52 |
| 2010/0309842 A1* | 12/2010 | Das | | H04L 1/0625 |
| | | | | 370/328 |
| 2013/0259243 A1* | 10/2013 | Herre | | G10L 19/00 |
| | | | | 381/57 |
| 2014/0003595 A1* | 1/2014 | Beerse | | H04M 3/566 |
| | | | | 379/201.02 |
| 2015/0012266 A1* | 1/2015 | Spittle | | G10L 21/003 |
| | | | | 704/206 |
| 2015/0081299 A1* | 3/2015 | Jasinschi | | A61B 5/165 |
| | | | | 704/246 |
| 2015/0287421 A1* | 10/2015 | Benway | | H04K 3/43 |
| | | | | 704/226 |
| 2015/0304360 A1* | 10/2015 | Ge | | H04N 7/15 |
| | | | | 348/14.07 |
| 2015/0341498 A1* | 11/2015 | Dickins | | H04M 3/2227 |
| | | | | 370/260 |
| 2016/0014516 A1* | 1/2016 | Tang | | H04R 5/04 |
| | | | | 381/304 |
| 2016/0142849 A1* | 5/2016 | Satheesh | | H04N 21/439 |
| | | | | 381/17 |
| 2016/0328529 A1* | 11/2016 | Kaib | | G08B 21/24 |
| 2016/0337510 A1* | 11/2016 | Li | | G10L 25/63 |
| 2017/0263270 A1* | 9/2017 | Kayama | | G10L 25/90 |
| 2018/0314689 A1* | 11/2018 | Wang | | G06F 40/58 |
| 2019/0060605 A1* | 2/2019 | Ramaprakash | | A61M 21/02 |
| 2019/0310707 A1* | 10/2019 | Hwang | | H04R 1/1041 |
| 2020/0098357 A1* | 3/2020 | Trim | | G10L 15/22 |

\* cited by examiner

US 11,017,790 B2

AVOIDING SPEECH COLLISIONS AMONG PARTICIPANTS DURING TELECONFERENCES

BACKGROUND

This disclosure relates to teleconferences and, more particularly, to improving intelligibility of teleconferences.

Teleconferences are an important collaborative tool that allows participants to communicate with one another despite being in different locations. Though teleconferences provide significant benefits, there are aspects of teleconferences that make it difficult for participants to follow and fully comprehend the conversation taking place. For example, in many cases, two (or more) participants have similar sounding voices. The participants' voices may be so similar that other participants have difficulty distinguishing between the similar sounding participants even when the participants speak at different times. Further, speech collisions are not uncommon during teleconferences. A speech collision refers to the situation where two or more participants speak concurrently during the teleconference. Human beings have difficulty comprehending a conversation when multiple participants speak at the same time. The speech collision problem is exacerbated when the participants speaking concurrently have similar sounding voices.

SUMMARY

In one or more embodiments, a method includes, during a teleconference, performing, using computer hardware, audio analysis of voices of a plurality of participants of the teleconference, determining, using the computer hardware, an emotive state for each of the plurality of participants during the teleconference, generating, using the computer hardware, a user frequency model for each of the plurality of participants based on the audio analysis and the emotive state, and adjusting, using the computer hardware, frequency of a voice of at least one of the plurality of participants during the teleconference based on the user frequency models of the plurality of participants to avoid a speech collision.

In one or more embodiments, a system includes a processor configured to initiate executable operations. The executable operations include, during a teleconference, performing audio analysis of voices of a plurality of participants of the teleconference, determining an emotive state for each of the plurality of participants during the teleconference, generating a user frequency model for each of the plurality of participants based on the audio analysis and the emotive state, and adjusting frequency of a voice of at least one of the plurality of participants during the teleconference based on the user frequency models of the plurality of participants to avoid a speech collision.

In one or more embodiments, a computer program product includes a computer readable storage medium having program code stored thereon. The program code is executable by a processor to initiate executable operations. The executable operations include, during a teleconference, performing audio analysis of voices of a plurality of participants of the teleconference, determining an emotive state for each of the plurality of participants during the teleconference, generating a user frequency model for each of the plurality of participants based on the audio analysis and the emotive state, and adjusting frequency of a voice of at least one of the plurality of participants during the teleconference based on the user frequency models of the plurality of participants to avoid a speech collision.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
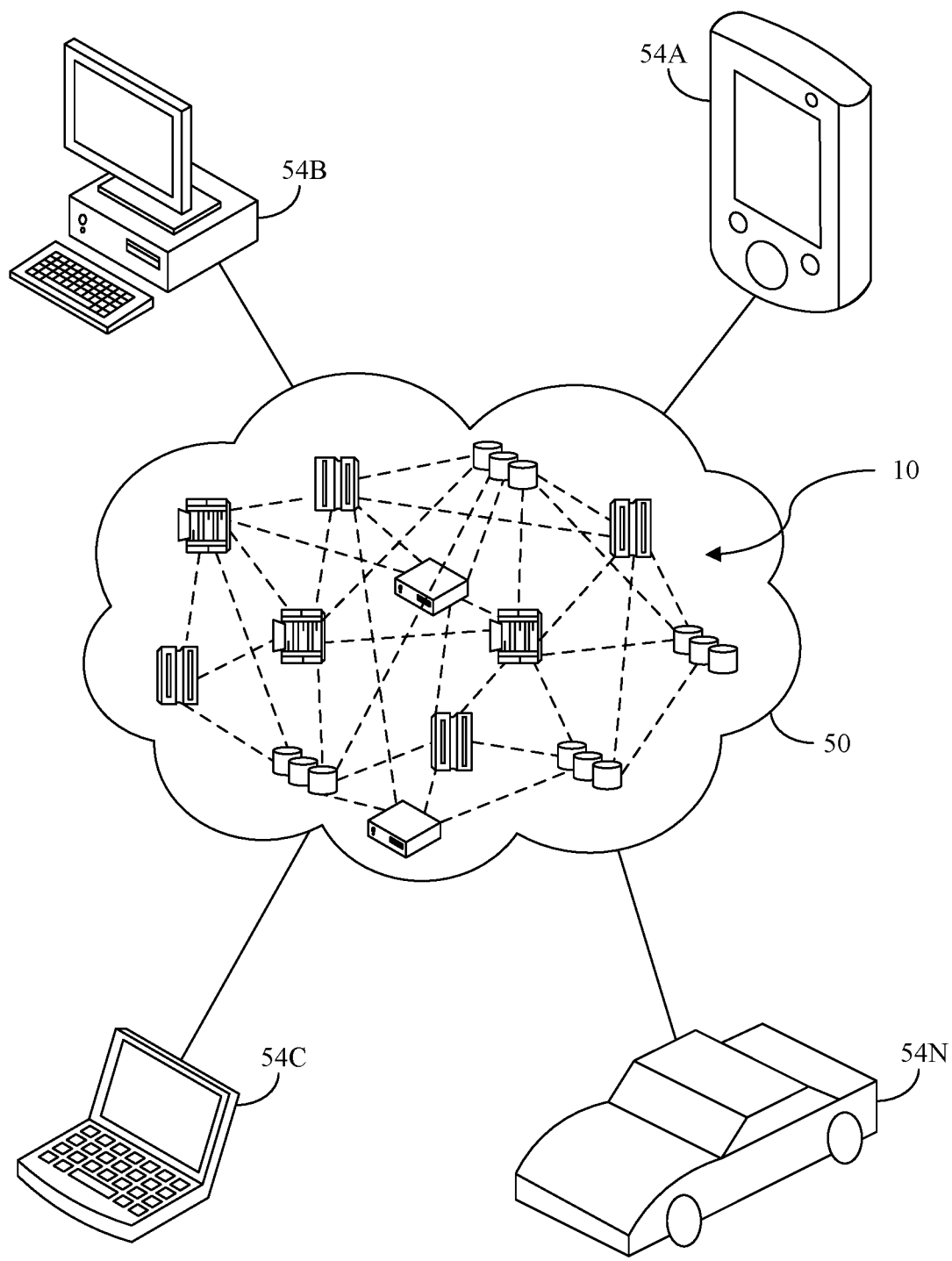
FIG. 1 depicts a cloud computing environment according to an embodiment of the present invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to teleconferences and, more particularly, to improving intelligibility of teleconferences. In general, a speech collision refers to a situation where two or more people speak over one another so that the discourse of one person overlaps that of one or more others. Speech collisions may also be referred to as "interleaved speech." The normal and informal discussion that takes place between people day-to-day routinely involves speech collisions. This manner of communication carries over into other forums such as teleconferences. Formal exchanges where one person completes a series of discourse prior to another person starting a discourse is not a realistic situation or a true reflection of how people communicate day-to-day and/or during teleconferences. The inventive arrangements described within this disclosure provide a system that is capable of reducing and/or eliminating speech collisions that often occur during teleconferences.

As defined herein, the term "teleconference" means any conference or meeting conducted through a communication system, e.g., an electronic communication system, that provides audio communication capabilities where participants are able to speak to one another. Examples of teleconferences include, but are not limited to, a multi-party telephone call whether using a conference telephone number and/or teleconference system or not, a videoconference that includes audio capabilities, a Web-conference that includes audio capabilities, or other collaborative system that allows or enables two or more than two participants to speak with one another. The term teleconference is intended to include or encompass those conferences where participants are permitted to speak (e.g., are not all muted except for a presenter) such that speech collisions may occur.

As defined herein, the term "speech collision" means an occurrence, during a teleconference, where two or more than two participants of the teleconference speak concurrently such that voices of two or more participants overlap in time. As defined herein, "avoiding a speech collision" means adjusting a feature, other than timing, of one or more participant voices so that the audio of a teleconference is more understandable than would otherwise be the case had the voices not been adjusted when a speech collision occurs; or, adjusting timing of speech of participants so that voices of a teleconference that overlap in time without adjustment no longer overlap in time after the adjustment. As defined herein, the term "participant" means a user that is taking part in a teleconference.

In one or more embodiments, a system is capable of performing audio analysis on participants of a teleconference. The system performs audio analysis on the voices of the respective participants during the teleconference. The audio analysis may include a frequency analysis for each participant that indicates where within the spectrum of audible sound each participant's voice is located. The system is capable of also performing emotive analysis on speech from the participants during the teleconference.

Based on the audio analysis and the emotive analysis that is performed, the system creates a user frequency model for each of the participants. The system is capable of adjusting a feature, e.g., frequency, of one or more participant voices during the teleconference based on the user frequency model of each respective participant to avoid speech collisions. In particular embodiments, the user speech models incorporate other aspects of the participants that may be determined during the teleconference, e.g., based on voice analysis, and/or determined from a profile associated with one or more of the participants. In particular embodiments, the system adjusts the frequency of participant voices up or down based on the user frequency models of the participants that are generated.

As the teleconference continues, the system is capable of continuing to perform the analysis described to update the user frequency models. As such, the system is capable of continuing to adjust the frequency of the voices of participants based on changing emotive content, new participants joining the teleconference, and/or other factors included in the updated user frequency models. In particular embodiments, the system is capable of adjusting features of participant voices other than frequency. As illustrative and non-limiting examples, the system is capable of adjusting volume, placement in a spatial field, and/or timing for one or more voices of the teleconference.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
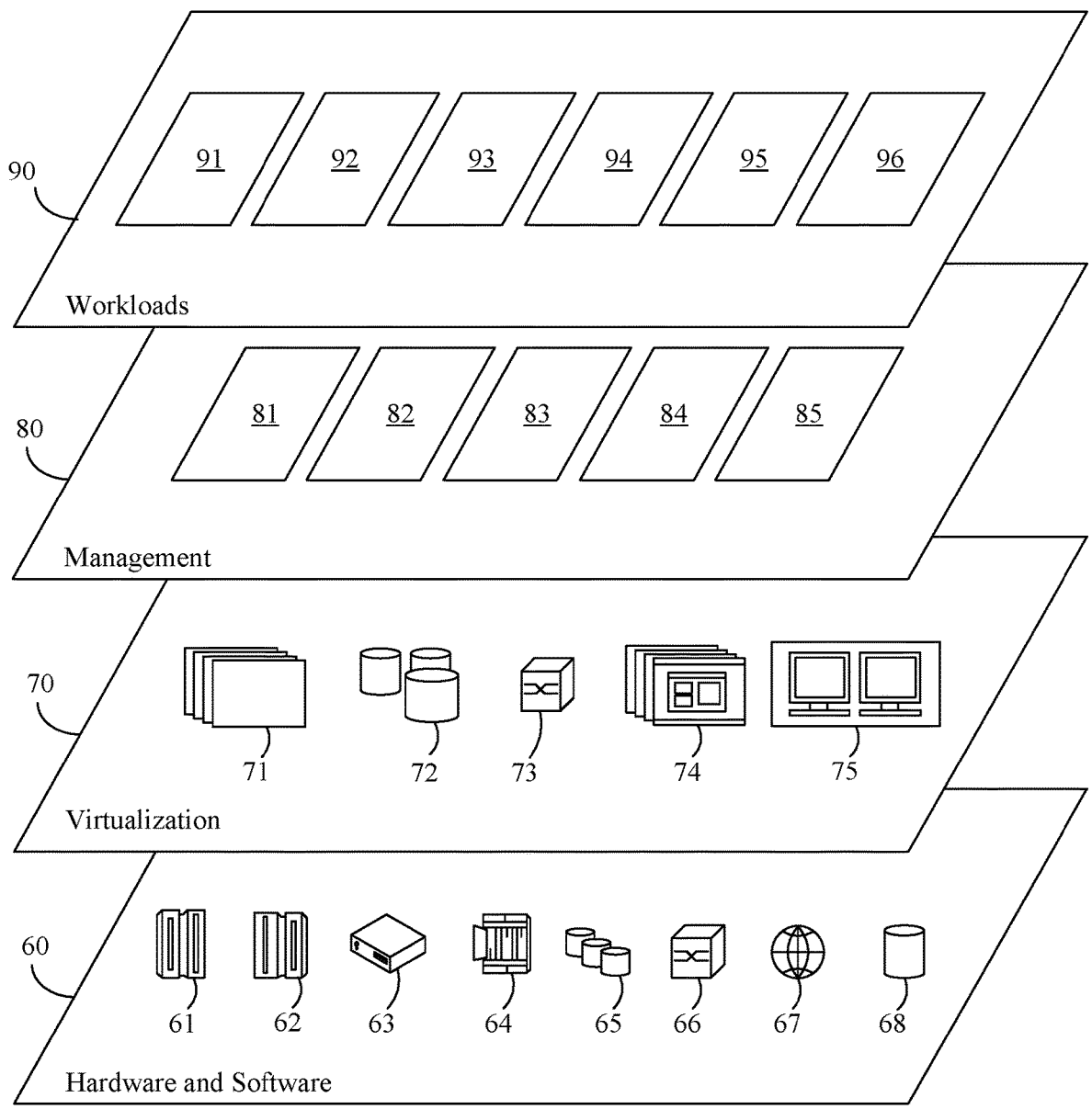
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a system 96 for avoiding speech collisions.

In one or more embodiments, system 96 is capable of performing audio analysis of voices of participants during a teleconference. System 96 is further capable of determining emotive states of the participants during the teleconference. Based on the audio analysis and the emotive states, the system is capable of generating a user frequency model for each of the participants of the teleconference. The system further adjusts one or more features of the voice of one or more participants during the teleconference based on the user frequency model of the respective participants to avoid speech collisions. For example, as participants of the teleconference engage in concurrent discourse, system 96 is capable of shifting the frequency of one or more voices of the participants. In particular embodiments, system 96 is capable of modifying or adjusting one or more other features of the voices of the participants to avoid speech collisions.

In one or more embodiments, system 96 is implemented separately from a teleconferencing system. For example, system 96 may be implemented to function cooperatively with a teleconferencing system. System 96 is capable of receiving audio, e.g., audio signals, digital audio streams, etc., from the teleconferencing system, performing the analysis described, and adjusting the frequency of one or more voices of the participants. System 96 may then output the resulting audio to the teleconferencing system for distribution to the participants. In one or more other embodiments, system 96 may be incorporated within or as part of a teleconferencing system itself.

Figure 3:
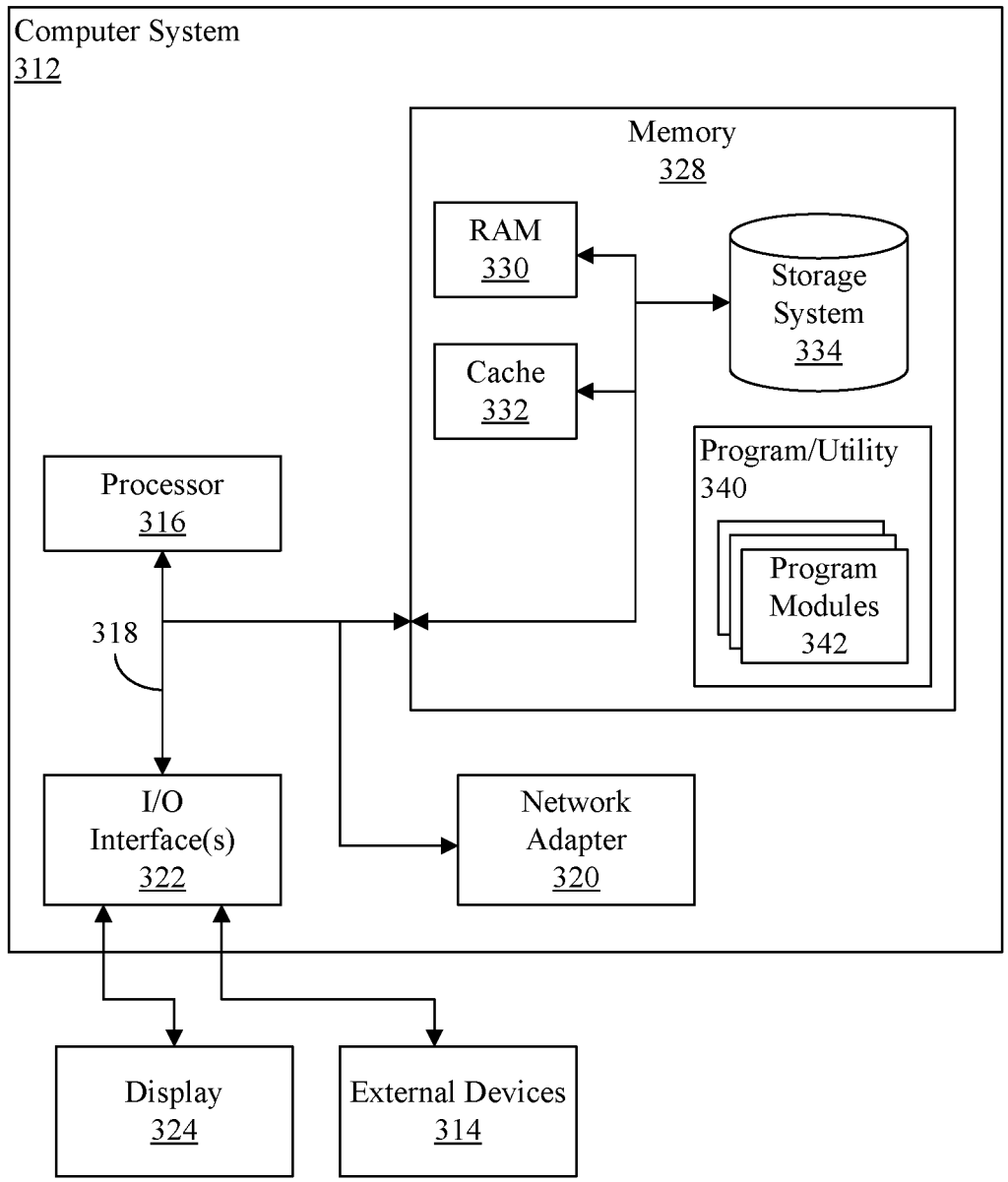
FIG. 3 depicts a cloud computing node according to an embodiment of the present invention.

FIG. 3 illustrates a schematic of an example of a computing node 300. In one or more embodiments, computing node 300 is an example of a suitable cloud computing node. Computing node 300 is not intended to suggest any limitation as to the scope of use or functionality of embodiments of the invention described herein. Computing node 300 is capable of performing any of the functionality described within this disclosure.

Computing node 300 includes a computer system 312, which is operational with numerous other general purpose or special purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. The components of computer system 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system readable media. Such media may be any available media that is accessible by computer system 312, and may include both volatile and non-volatile media, removable and non-removable media.

Memory 328 may include computer system readable media in the form of volatile memory, such as random access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include system 96 or portions thereof.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via Input/Output (I/O) interfaces 322. Still yet, computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that although not shown, other hardware and/or software components could be used in conjunction with computer system 312. Examples, include, but are not limited to: microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that described in connection with FIG. 3 may be used in a non-cloud computing implementation to perform the various operations described herein. In this regard, the example embodiments described herein are not intended to be limited to a cloud computing environment. Computing node 300 is an example of a data processing system. As defined herein, the term "data processing system" means one or more hardware systems configured to process data, each hardware system including at least one processor programmed to initiate executable operations and memory.

Computing node 300 is an example of computer hardware. Computing node 300 may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 300 is also an example of a server. As defined herein, the term "server" means a data processing system configured to share services with one or more other data processing systems. In particular embodiments, computing node 300 may be used to implement a teleconferencing server configured to perform the operations described herein relating to speech collision avoidance.

Figure 4:
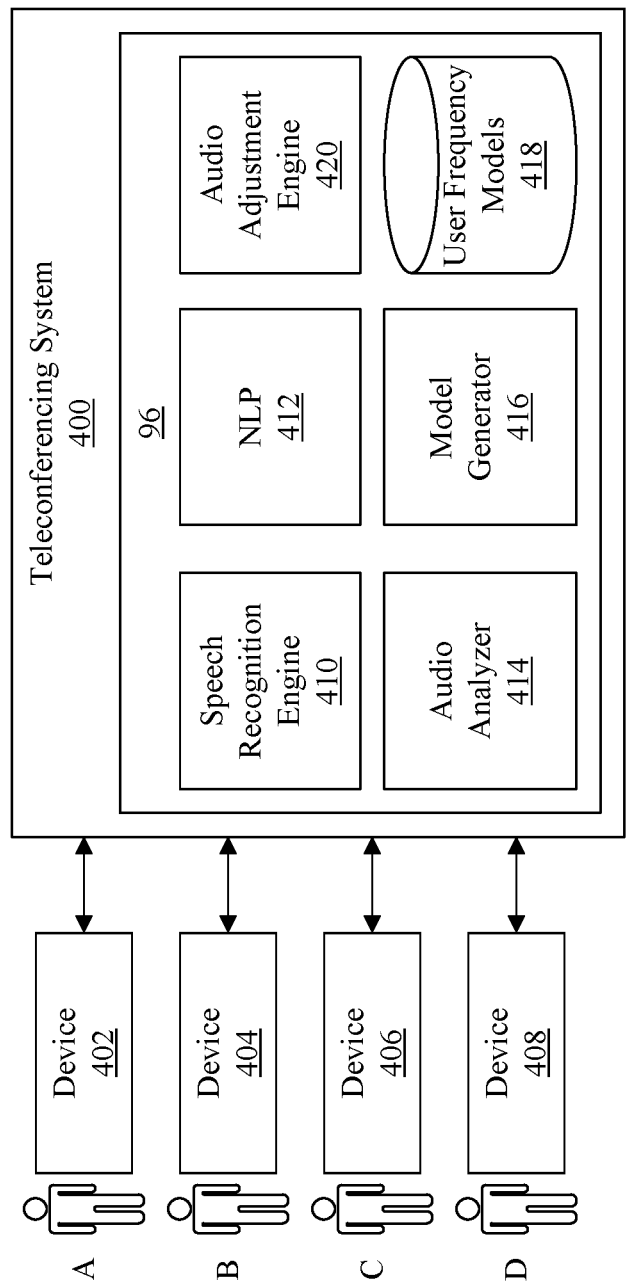
FIG. 4 depicts a teleconferencing system configured to avoid speech collisions according to an embodiment of the present invention.

FIG. 4 depicts an example of a teleconferencing system 400 configured for speech collision avoidance according to an embodiment of the present invention. In the example of FIG. 4, teleconferencing system 400 is implemented to include speech collision avoidance system 96. In one or more embodiments, system 96 may be implemented separately from teleconferencing system 400 and work in a coordinated manner with teleconferencing system 400. Teleconferencing system 400 and/or system 96 may be implemented as described in connection with FIGS. 1-3 of this disclosure, whether using cloud computing infrastructure, as a standalone server, or other suitable variation.

In the example of FIG. 4, teleconferencing system 400 is capable of conducting a teleconference involving a plurality of participants A, B, C, and D, each communicating through a device 402, 404, 406, and 408, respectively. Devices 402-408 may be any of a variety of devices suitable for joining and participating in any of the various teleconferences described herein. Examples of a devices that are suitable for joining and participating in teleconferences include, but are not limited to, a workstation, a desktop computer, a mobile computer, a laptop computer, a netbook computer, a tablet computer, a smart phone, a smart watch, a telephone (whether VoIP and/or conventional), a gaming device, a set-top box, a smart television and/or appliance, and the like. Devices 402-408, for example, include an audio system having a microphone and a speaker and some form of transceiver (wired or wireless) or network adapter for communicating with teleconferencing system 400.

System 96 may include a speech recognition engine (SRE) 410, a natural language processor (NLP) 412, an audio analyzer 414, a model generator 416, a data storage device 418 including a plurality of user frequency models, and an audio adjustment engine 420. In the example of FIG. 4, audio of the teleconference is provided to SRE 410. SRE 410 is capable of converting user spoken utterances, e.g., speech, into text for further analysis. In particular embodiments, the audio for each different user device 402-408 may be differentiated so that SRE 410 is capable of generating a text translation of the speech of each respective participant A-D, where the resulting text of each participant is also distinguished for purposes of processing the speech recognized text of each participant independently of the others. In particular embodiments, SRE 410 is capable of determining the rapidity or velocity of speech of participants A-D.

NLP 412 is capable of receiving the text corresponding to each of participants A-D from SRE 410 and processing the text. Natural language processing is a field of computer science, artificial intelligence, and linguistics which implements computer processes to facilitate interactions between computer systems and human (natural) languages. Natural language processing enables computers to derive computer-understandable meaning from natural language input. The International Organization for Standardization (ISO) publishes standards for natural language processing, one such standard being ISO/TC37/SC4. Accordingly, NLP 412 is capable of performing operations on received text including, but not limited to, semantic analysis. Semantic analysis may follow other operations also performed by NLP 412 such as parsing and extraction of context-independent aspects of a sentence's meaning such as entities, named entities, the semantic roles of entities mentioned in the sentence, and quantification information, such as cardinality, iteration, and dependency.

In the example of FIG. 4, NLP 412 is capable of performing emotive analysis of received text corresponding to participants A-D to determine an emotive state for each participant based on speech. Emotive analysis may include performing a linguistic analysis of text to detect emotional and language tones in the text. For example, NLP 412 may include a tone analyzer. An example of a tone analyzer is the IBM Watson™ Tone Analyzer service available from IBM Corporation of Armonk, N.Y. NLP 412 is capable of determining, for example, whether a given portion of text indicates anger, disgust, fear, joy, and/or sadness. For a given portion of text, NLP 412 is capable of outputting each of the five emotions and a score for each emotion. The score for each emotion is typically between 0 and 1 and indicates the confidence level of the corresponding emotion. In particular embodiments, the score may be used to indicate a degree or magnitude of the corresponding emotion for the analyzed text. As an illustrative and non-limiting example, for a given portion of text, NLP 412 may generate an output indicating: joy (0.47), anger (0.14), disgust (0.13), sadness (0.50), and fear (0.09).

In one or more other embodiments, NLP 412 is also capable of classifying text as being analytical, technical, or confident. NLP 412 is capable of generating an additional output between 0 and 1, for example, that indicates the classification of the text being analyzed. As an illustrative and non-limiting example, NLP 412 is capable of classifying text as analytical, technical, or confident based on a score where a score less than 0.5 indicates analytical, a score of 0.5 to 0.75 indicates technical, and a score above 0.75 indicates confident. It should be appreciated that the values provided are for purposes of illustration and not limitation. Other ranges may be defined to classify text as analytical, technical, or confident than those listed.

In one or more other embodiments, NLP 412 is capable of analyzing text derived from speech of participants A-D to determine the sentiment being expressed. The sentiment may be negative or positive. In this regard, NLP 412 is capable of outputting an indication of sentiment such as positive or negative along with a score indicating the confidence of the sentiment determination. In particular embodiments, the score may be used to indicate degree of positivity or negativity as the case may be. The score is typically between 0 and 1. An example implementation of a sentiment analyzer that may be included in NLP 412 is the Watson Natural Language Understanding Service.

In the example of FIG. 4, audio from the teleconference may also be provided to audio analyzer 414. Audio analyzer 414 is capable of performing a frequency analysis on the audio received from each of participants A-D. For example, audio analyzer 414 is capable of generating a frequency profile of the voice of each of users A-D. In one or more embodiments, audio analyzer 414 is capable of generating a frequency profile that specifies a frequency range determined for the voice of each user and the median frequency. As an illustrative and non-limiting example, audio analyzer 414 may determine the following frequency profiles for participants of the teleconference:

Participant A: Frequency range of 165 to 255 Hz; Median frequency of 210 Hz.
Participant B: Frequency range of 175 to 255 Hz; Median frequency of 215 Hz.
Participant C: Frequency range of 85 to 180 Hz; Median frequency of 132.5 Hz.
Participant D: Frequency range of 90 to 185 Hz; Median frequency of 137.5 Hz.

In one or more other embodiments, audio analyzer 414 is capable of determining additional features of the voices of the participants including, but not limited to, the volume level or average volume level for the participants. While NLP 412 is described as determining emotive states of participants based on the processing described, in particular embodiments, emotive state may also be determined based on volume, frequency, or other features determined from the voices of the participants. These features may be used separately or in combination with content of speech to determine emotive states of the participants. In another example, system 96 may also use rapidity or velocity of speech alone or in combination with volume, frequency, and/or content of speech to determine emotive state of the participants.

It should be appreciated that audio analyzer 414 is capable of continuing to perform the analysis described throughout the duration of the teleconference. As such, audio analyzer 414 is capable of updating the frequency profiles generated for each respective participant over time during the teleconference to reflect the latest or most recent period of time in the teleconference. For example, the frequency profiles may reflect the last minute, the last 30 seconds, the last 15 seconds, or other time period of audio for a given participant.

Model generator 416 is capable of generating user frequency models and storing the user frequency models in data storage device 418 for use during the teleconference. In one or more embodiments, model generator 416 is capable of taking output generated by audio analyzer 414 and output generated by NLP 412 corresponding to each respective participant in the teleconference in generating a user frequency model for each participant. In the example of FIG. 4, model generator 416 creates a user frequency model for each of participants A-D. Each user frequency model may specify the frequency profile and the emotive analysis (e.g., emotive state) for a particular participant in the teleconference. In one or more other embodiments, model generator 416 may include rapidity or velocity of speech of a participant, as determined by SRE 410, in the user frequency model.

Audio adjustment engine 420 is capable of adjusting one or more features of the voices of participants A-D during the teleconference to avoid speech collisions. In one aspect, audio adjustment engine 420 is capable of adjusting or shifting the frequency of voice of one or more of participants A-D during the teleconference so that the voices of the participants are located in different portions of the audible frequency spectrum during the teleconference. Audio adjustment engine 420 is capable of using the user frequency models to determine which direction to shift (e.g., up or down) the frequency of the different voices of participants A-D. Audio adjustment engine 420 is capable of modifying the frequency of participant voices during the teleconference so that the voice of each participant A-D occupies a unique frequency range in the audible frequency spectrum based on the user frequency models.

For purposes of illustration, the voice of each of participants A-D may be heard and understood by the other participants when confined to a width of approximately 60 Hz in the audible frequency spectrum. As an illustrative and non-limiting example, the frequency of participant voices may be shifted so that the median frequency of the user's voice is at the center of the 60 Hz range of audible frequency spectrum allocated to the participant. This arrangement can accommodate approximately 15 teleconference participants. In particular embodiments, audio adjustment engine 420 may allocate participants among these different 60 Hz ranges and may also utilize filtering to prevent bleeding of one voice into the frequency range of another voice. In cases where a teleconference has more than 15 participants, the audio adjustment engine may restrict the frequency range to less than 60 Hz and/or allow a predetermined amount of bleeding into frequency ranges allocated to other participants.

By adjusting the frequency of the voices of participants during the teleconference, system 96 is capable of increasing the likelihood that each participant will be understood during speech collisions since each participant's voice has been allocated, e.g., pocketed, into a specific range of the audible frequency spectrum. This allows other participants to readily understand other participants that may be speaking concurrently during the teleconference.

In one or more embodiments, the system is capable of positioning the voice of a selected participant, e.g., a moderator of the teleconference, to a middle or center portion of the audible frequency spectrum and positioning the frequency of the voices of the other participants above and below the position of the moderator. The other voices may be positioned equally or evenly above and below the position of the voice of the moderator in the audible frequency spectrum. As discussed, system 96 may adjust the frequency of the voices of participants so that the voices do not overlap in frequency based on the user frequency models.

In one or more other embodiments, audio adjustment engine 420 is capable of adjusting features of participant voices other than frequency. In one example, audio adjustment engine 420 is capable of increasing or decreasing the volume of the voice of a participant during the teleconference. In another example, audio adjustment engine 420 is capable of adjusting the location of a participant voice in a spatial field. For example, audio adjustment engine 420 may shift the position of participant voices to the left and/or to the right in the stereo field. In cases where the teleconferencing system supports a larger spatial field that may include foreground and background, audio adjustment engine 420 may also shift the position of participant voices to the foreground and/or to the background. Each of the aforementioned adjustments, whether for volume and/or for location and the spatial field, may be performed based upon the user frequency models of the participants.

In particular embodiments, audio adjustment engine 420 is capable of mapping out the participant voices during the teleconference so that voices do not overlap with respect to frequency, volume, and/or location and the spatial field. By avoiding these overlaps, system 96 ensures that participants will be understood despite speaking concurrently. For example, system 96 ensures that participants speaking concurrently are not doing so in a same frequency range of the audible frequency spectrum, are not doing so with same or similar volume, and/or are not doing so with same or similar location and the spatial field.

In another embodiment, audio adjustment engine 420 is capable of adjusting a decay of a participant's voice (e.g., a portion of the participant's speech) during the teleconference. For example, audio adjustment engine 420 is capable of determining that a participant is or has finished speaking and, in response, shortening and/or truncating the ending portion of the participant's speech. As an illustrative and non-limiting example, the system is capable of truncating or shortening the audio corresponding to a last word or set of words in a participant spoken utterance. For example, audio adjustment engine 420 may speed up the last word or words without changing the pitch of the audio or may drop portions of the audio so as to shorten the duration of a spoken word without making the audio unintelligible. This operation creates space between the voice of the participant that is finished speaking and the voice of another participant that may begin speaking. In particular embodiments, audio adjustment engine 420 is capable of performing the adjustment of decay only in response to detecting an end of one participant speaking within a predetermined amount of time of the start of another participant speaking and/or the voices of the participants overlapping for no more than a maximum amount of time. By adjusting decay, system 96 is capable of creating additional space between voices of the participants and, in some cases, avoiding overlapping speech from different participants.

Figure 5:
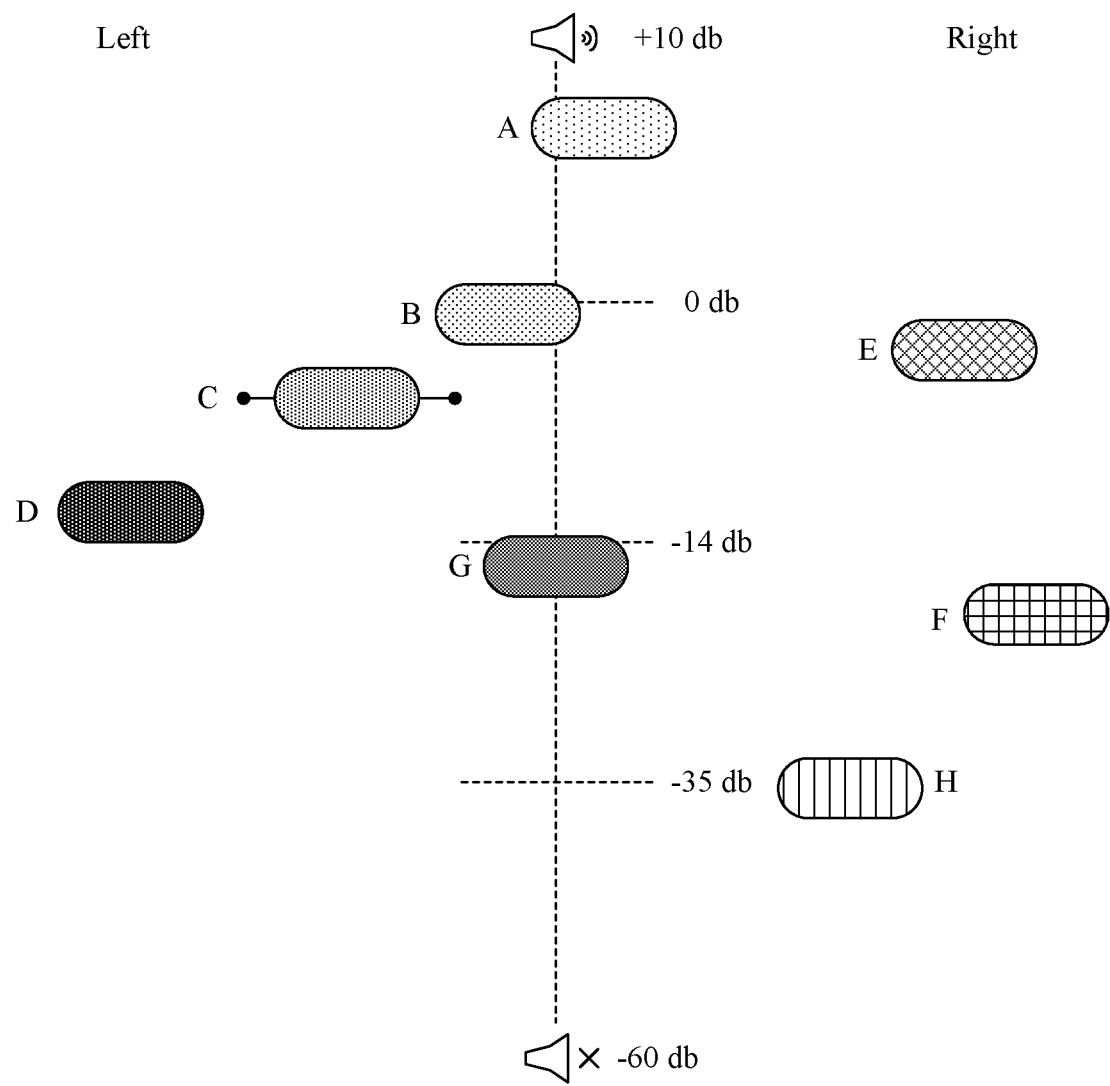
FIG. 5 illustrates speech collision avoidance according to an embodiment of the present invention.

FIG. 5 illustrates speech collision avoidance according to an embodiment of the present invention. FIG. 5 illustrates the placement of voices of participants A, B, C, D, E, F, G, and H after processing by system 96. The example of FIG. 5 illustrates that the system has mapped the voices of the teleconference so as not to overlap in volume, frequency, and spatial field. FIG. 5 illustrates varied and non-overlapping positions of voices of participants in the spatial field (e.g., the stereo field in this example), in the audible frequency spectrum, and with respect to volumes.

In the example of FIG. 5, the system has adjusted one or more or all of the noted features of the voice of one or more participants to achieve the mapping shown. In the example of FIG. 5, volume is indicated on the vertical axis. As shown, each voice is mapped to a unique volume. Left and right in the stereo field is illustrated with left to right placement of the participants. As shown, each participant is mapped to a unique position in the stereo field. The frequency range allocated to each participant is indicated with shading. As pictured, the shading of each participant is different indicating that the frequency of the voice of one or more participants has been adjusted so that no participant voice occupies the frequency range of another participant voice.

Figure 6:
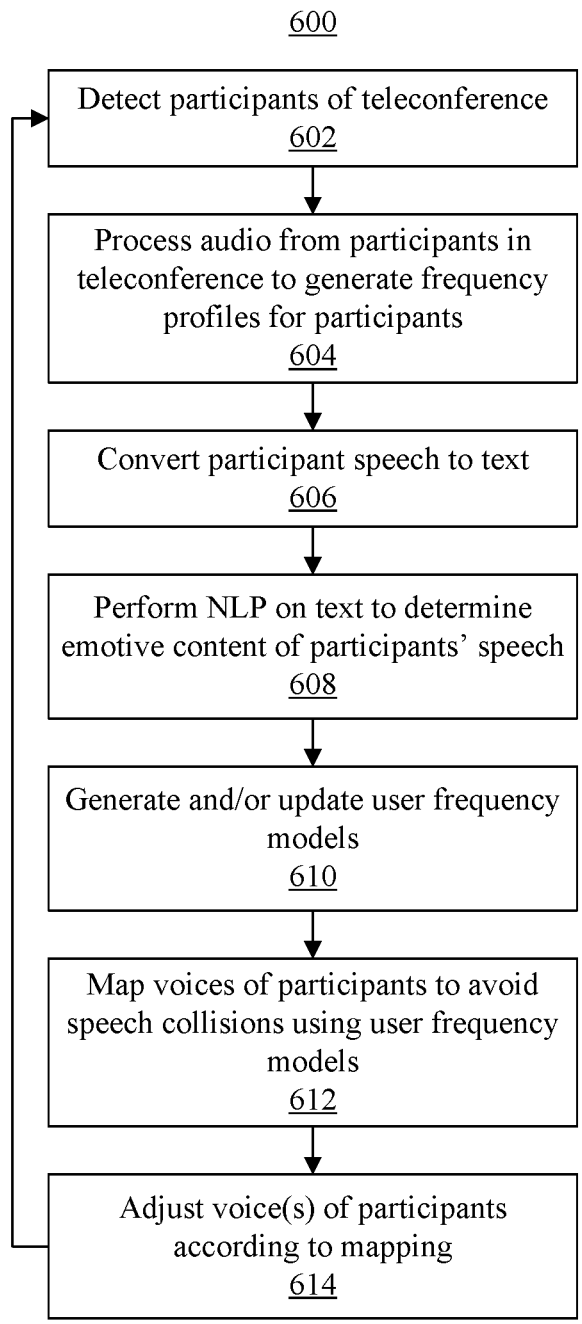
FIG. 6 illustrates a method of avoiding speech collisions during a teleconference according to an embodiment of the present invention.

FIG. 6 illustrates a method 600 of avoiding speech collisions during a teleconference according to an embodiment of the present invention. Method 600 may be performed by a system as described herein in connection with FIGS. 1-5.

In block 602, the system is capable of detecting participants of the teleconference. For example, the system is capable of determining the number of participants in the teleconference. In one or more embodiments, the system is also capable of determining whether each participant is associated with a user profile. In cases where users are associated with user profiles, the system is capable of retrieving the user profile for each such participant in response to detecting that the participant has joined the teleconference.

In block 604, the system is capable of processing audio from the participants in the teleconference to generate a frequency profile for each participant. In block 606, the system is capable of converting participant speech into text. In block 608, the system is capable of performing natural language processing on the text to determine emotive content of the speech of each of the participants. It should be appreciated that emotive content may also be determined from the audio analysis that is performed and/or from the speech recognition that is performed.

The system is capable of detecting features of voices of participants such as a frequency and volume and detecting changes in these features over time during the teleconference. The system may use detected changes in these features as indicators of emotive states of the user. For example, a participant's voice that increases in frequency over time indicates that the participant is becoming increasingly excited and/or increasingly happy. Detecting increasing volume also indicates that the participant is becoming increasingly excited and/or happy. Decreasing volume and/or decreasing frequency may indicate that the participant is becoming less excited and/or less happy.

In block 610, the system is capable of generating a user frequency model for each participant in the teleconference. As discussed, the user frequency model for each participant may include the frequency profile for the participant and the emotive content determined based on the participant speech. In particular embodiments, the system is capable of including further information from the frequency profiles such as detected changes in frequency and/or volume as indicators of emotive state.

In one or more other embodiments, the system is capable of including one or more features that may be obtained from a user profile determined in block 602. The user profile may include user specific data such as the participant's job title and/or role within an organization, the participant's gender, the participant's age, the language spoken by the participant, and/or other demographic information for the participant.

It should be appreciated, that as method 600 continues to iterate throughout the duration of the teleconference, the system is capable of detecting whether new participants have joined the teleconference in block 602. The system is capable of creating user frequency models for each new participant that joins the teleconference. Further, in block 610, as the teleconference continues and method 600 continues to iterate, the system is capable of updating existing user frequency models to include the most recent and/or up-to-date emotive content as determined from each respective participant's speech.

In block 612, the system is capable of mapping the voices of the participants to avoid speech collisions using the user frequency models. The system is capable of mapping the voices of the users to unique frequency ranges, unique volumes, and/or unique locations in the spatial field. In another example, the system is capable of mapping the voices so as not to overlap in terms of frequency, volume, and/or location in the spatial field.

Taking the previous example where participants A and B have similarly pitched voices (e.g., where the median frequency of participant A's voice is 210 and the median frequency of participant B's voice is 215), the system is capable of determining that the voices are not separated by a sufficient frequency gap. As such, the system is capable of moving the voices of participants A and B farther apart in terms of median frequency. As an illustrative and non-limiting example, in the case where participant A is determined to be more negative at the beginning of the teleconference, participant A may be moved lower in frequency at the start of the teleconference. In this example, the emotive state of participant A is used by the system to indicate the direction of the adjustment that is performed. As participant A becomes more positive later in the teleconference, the system may change the adjustment so that the frequency of participant A's voice is increased as opposed to decrease in order to create distance between the voice of participant A and the voice of participant B. In the latter example, the system changes the direction of the adjustment in response to the changing emotive state of participant A.

Regarding emotive analysis and the effect of such analysis on the adjustment of participant voices, positive sentiment and/or joy may be associated with higher frequency in voice, while other emotive content such as sadness or being tired may be associated with lower frequency in voice. In this regard, the system is capable of determining the direction that a particular voice of a participant should be adjusted during the mapping and/or adjusting operations based on the emotive content of the speech of the participant and/or other information indicating emotive state. For example, in the case where the system determines that a participant is joyful, the system will adjust the frequency of the participant's voice higher to avoid a speech collision with another participant. In the case where the system determines that a participant is sad, the system will adjust the frequency of the participant's voice lower to avoid a speech collision with another participant.

The system is capable of making similar determinations by correlating emotive states with locations in the spatial field and/or with particular volumes. For example, the system is capable of placing participants determined to exhibit similar emotive states in same regions of the spatial field. Taking the prior example, in the case where a participant is determined to be joyful, the system may pan the voice of the participant to the right. The system may pan the voice of a participant determined to be sad to the left.

Regarding volume, in the case where the system determines that a participant is joyful, the system is capable of increasing the volume of the participant's voice to avoid a speech collision with another participant. In the case where the system determines that a participant is angry, the system is capable of decreasing the volume of the participant's voice to avoid a speech collision with another participant.

As discussed, other factors such as the rapidity or velocity of speech may be indicators of emotive content. For example, the system may determine that higher velocity speech (e.g., a detected increase in velocity of speech) indicates that a participant is becoming increasingly excited, which may cause the system to increase the frequency of the voice of the participant to avoid a speech collision.

The system may also use other attributes as determined from the user profile to determine the direction of adjustment of the voice of the participant. Within the system, certain features such as gender and/or age may be associated with an increase or a decrease in frequency depending upon preference and/or system configuration to avoid speech collisions. Similarly, such features may be associated with an increase or a decrease in volume and/or a particular direction of adjustment in the spatial field depending upon preference and/or system configuration.

As an illustrative and non-limiting example, participants of different gender typically speak in different frequency ranges. For example, males often speak in a lower frequency range than females. The system may use the user profile of a user so that, for example, a participant voice of a male is shifted lower in frequency, while a participant voice of a female is shifted higher in frequency. In another example, a person's voice often deepens, e.g., frequency range becomes lower, with age. In that case, the system may shift the voice of a participant with an age greater than a threshold age lower in frequency while shifting the voice of another participant of an age less than the threshold age higher in frequency. In still another example, particular languages and/or accents may use particular intonation patterns that require a particular frequency range (e.g., are more comprehensible when in the frequency range). In that case, the system may shift voices of users that speak particular languages or have particular accents to frequency ranges that are suited to the language and/or accent spoken by the respective participants.

In one or more other embodiments, the system is capable of determining the quality of the audio connection for the participants and using quality of audio connection as another differentiating factor to avoid speech collisions. The system, for example, may determine that participant A is speaking over a mobile phone connection having lesser quality audio than the connection of other participants on the teleconference. In that case, the system may not adjust features of participant A's voice since the quality of connection (e.g., sounding like one is in a tunnel) may be a sufficient differentiator such that speech collisions are already reduced due to the difference in quality of audio connections. In other cases, the system may apply a sound effect (e.g., sounding like one is in a tunnel) to the voice of a participant in addition to, or in lieu of, the other adjustments described to avoid a speech collision.

In particular embodiments, the system is capable of generating the mapping using one or more of the various techniques described. The system is capable of considering one or more or any combination of the above-described features to determine a particular direction or manner of adjustment of voices of the participants. In one aspect, for example, the system quantifies the different parameters described on a per participant basis, optionally assigns weights to the parameters, and determines a final value or result that indicates the direction that the voice of the participant should be moved to avoid a speech collision. In particular embodiments, the user frequency models indicate this value or result.

In block 614, the system is capable of adjusting the voices of participants according to the mapping determined in block 612. For example, the system is capable of shifting the frequency of participant voices higher in frequency or lower in frequency, shifting the volume of participant voices louder (e.g., higher) or softer (e.g., lower), and/or moving the location of the participant voices within the spatial field to the left or to the right and/or to the front or to the back based on the mapping that is generated.

After block 614, method 600 loops back to block 602 to continue processing. In this manner, the system is capable of performing real time or near real time analysis of participant voices and making adjustments continually throughout the duration of the teleconference. As such, the particular region in the mapping to which each participant is assigned during the teleconference may change as new participants join the teleconference, as existing participants leave the teleconference, and as the emotive states of the participants change over time.

In one or more other embodiments, the system is capable of using emotive analysis to predict when speech collisions are likely to occur. For example, in response to determining that one or more participants are exhibiting an increase in excitement, anger, etc., the system may determine that speech collisions are more likely to occur, e.g., that participants are more likely to speak over one another when excited or angry. In response to such a prediction, the system may perform the mapping and adjustments described.

Figure 7:
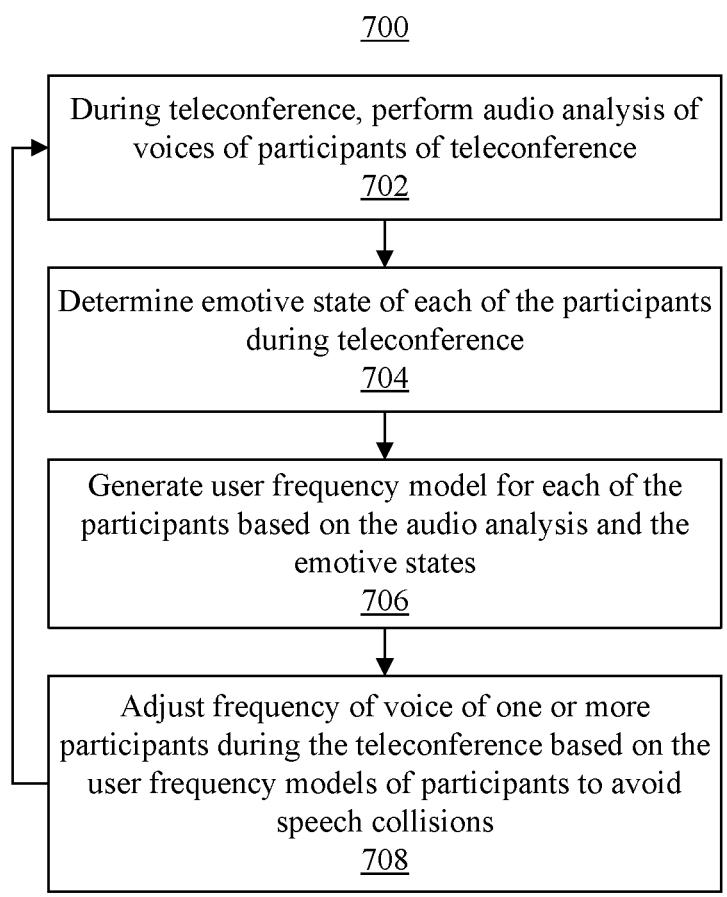
FIG. 7 illustrates a method of avoiding speech collisions during a teleconference according to another embodiment of the present invention.

FIG. 7 illustrates a method 700 of avoiding speech collisions during a teleconference according to another embodiment of the present invention. Method 700 may be performed by a system as described herein in connection with FIGS. 1-5.

In block 702, the system is capable of performing, during a teleconference, audio analysis of voices of a plurality of participants of the teleconference. In block 704, the system is capable of determining an emotive state for each of the plurality of participants during the teleconference. In block 706, the system is capable of generating a user frequency model for each of the plurality of participants based on the audio analysis and the emotive state for that participant.

In block 708, the system is capable of adjusting frequency of a voice of at least one of the plurality of participants during the teleconference based on the user frequency models of the plurality of participants to avoid a speech collision. For example, the system is capable of adjusting frequency by increasing or decreasing frequency of the voice of the at least one of the plurality of participants based on the user frequency models for the participants. The system may modify the frequency of the voice of the at least one of the plurality of participants during the teleconference so that the voice of the at least one of the plurality of participants occupies a unique frequency range in an audible spectrum based on the user frequency models.

In one or more embodiments, the adjusting includes adjusting at least one of volume or location in a spatial field of the voice of the at least one of the plurality of participants during the teleconference based on the user frequency models of the plurality of participants to avoid the speech collision. In particular embodiments, the system is capable of adjusting a decay of a portion of speech of the at least one of the plurality of participants during the teleconference to create space between the portion of speech of the at least one of the plurality of participants and a portion of speech of another one of the plurality of participants.

After block 708, the system is capable of looping back to block 702. The system may continue to detect changes in the emotive states of the plurality of participants over time during the teleconference and update the user frequency models based on the changes.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
during a teleconference, performing, using computer hardware, audio analysis of voices of a plurality of participants of the teleconference;
determining, using the computer hardware, an emotive state for each of the plurality of participants during the teleconference;
generating, using the computer hardware, a user frequency model for each of the plurality of participants based on the audio analysis and the emotive state; and
adjusting, using the computer hardware, frequency of a voice of at least one of the plurality of participants during the teleconference based on the user frequency models of the plurality of participants to avoid a speech collision, wherein
the adjusting modifies frequency of the voice of the at least one of the plurality of participants during the teleconference so that the voice of the at least one of the plurality of participants occupies a unique frequency range in an audible spectrum, wherein
the unique frequency range has a predetermined width, and the adjusting includes shifting a median frequency of the voice to a center of the unique frequency range allocated to the voice.

2. The method of claim 1, wherein
the adjusting increases or decreases frequency of the voice of the at least one of the plurality of participants.

3. The method of claim 1, further comprising:
detecting changes in the emotive states of the plurality of participants over time during the teleconference and updating the user frequency models based on the changes.

4. The method of claim 1, further comprising:
positioning a moderator of the teleconference in a middle portion of an audible frequency spectrum and positioning the plurality of participants evenly above and below the middle portion of the audible frequency spectrum without overlap based on the user frequency models.

5. The method of claim 1, further comprising:
adjusting at least one of volume or location in a spatial field of the voice of the at least one of the plurality of participants during the teleconference based on the user frequency models of the plurality of participants to avoid the speech collision.

6. The method of claim 1, further comprising:
adjusting a decay of a portion of speech of the at least one of the plurality of participants during the teleconference to create space between the portion of speech of the at least one of the plurality of participants and a portion of speech of another one of the plurality of participants.

7. A system, comprising:
a processor configured to initiate executable operations including:
during a teleconference, performing audio analysis of voices of a plurality of participants of the teleconference;
determining an emotive state for each of the plurality of participants during the teleconference;
generating a user frequency model for each of the plurality of participants based on the audio analysis and the emotive state; and
adjusting frequency of a voice of at least one of the plurality of participants during the teleconference based on the user frequency models of the plurality of participants to avoid a speech collision, wherein
the adjusting modifies frequency of the voice of the at least one of the plurality of participants during the teleconference so that the voice of the at least one of the plurality of participants occupies a unique frequency range in an audible spectrum, wherein the adjusting modifies frequency of the voice of the at least one of the plurality of participants during the teleconference so that the voice of the at least one of the plurality of participants occupies a unique frequency range in an audible spectrum, wherein
the unique frequency range has a predetermined width, and the adjusting includes shifting a median frequency of the voice to a center of the unique frequency range allocated to the voice.

8. The system of claim 7, wherein
the adjusting increases or decreases frequency of the voice of the at least one of the plurality of participants.

9. The system of claim 7, wherein
the processor is further configured to initiate executable operations comprising:
detecting changes in the emotive states of the plurality of participants over time during the teleconference and updating the user frequency models based on the changes.

10. The system of claim 7, wherein
the processor is further configured to initiate executable operations comprising:
positioning a moderator of the teleconference in a middle portion of an audible frequency spectrum and positioning the plurality of participants evenly above and below the middle portion of the audible frequency spectrum without overlap based on the user frequency models.

11. The system of claim 7, wherein
the processor is further configured to initiate executable operations comprising:
adjusting at least one of volume or location in a spatial field of the voice of the at least one of the plurality of participants during the teleconference based on the user frequency models of the plurality of participants to avoid the speech collision.

12. The system of claim 7, wherein
the processor is further configured to initiate executable operations comprising:
adjusting a decay of a portion of speech of the at least one of the plurality of participants during the teleconference to create space between the portion of speech of the at least one of the plurality of participants and a portion of speech of another one of the plurality of participants.

13. A computer program product comprising a computer readable storage medium having program instructions embodied therewith, the program instructions executable by a processor to cause the processor to initiate executable operations comprising:
during a teleconference, performing audio analysis of voices of a plurality of participants of the teleconference;
determining an emotive state for each of the plurality of participants during the teleconference;
generating a user frequency model for each of the plurality of participants based on the audio analysis and the emotive state; and
adjusting frequency of a voice of at least one of the plurality of participants during the teleconference based on the user frequency models of the plurality of participants to avoid a speech collision, wherein the adjusting modifies frequency of the voice of the at least one of the plurality of participants during the teleconference so that the voice of the at least one of the plurality of participants occupies a unique frequency range in an audible spectrum, wherein the unique frequency range has a predetermined width, and the adjusting includes shifting a median frequency of the voice to a center of the unique frequency range allocated to the voice.

14. The computer program product of claim 13, wherein the adjusting increases or decreases frequency of the voice of the at least one of the plurality of participants.

15. The computer program product of claim 13, wherein the program instructions are executable by the processor to cause the processor to initiate executable operations further comprising:

detecting changes in the emotive states of the plurality of participants over time during the teleconference and updating the user frequency models based on the changes.

16. The computer program product of claim 13, wherein the program instructions are executable by the processor to cause the processor to initiate executable operations further comprising:

positioning a moderator of the teleconference in a middle portion of an audible frequency spectrum and positioning the plurality of participants evenly above and below the middle portion of the audible frequency spectrum without overlap based on the user frequency models.

17. The computer program product of claim 13, wherein the program instructions are executable by the processor to cause the processor to initiate executable operations further comprising:

adjusting at least one of volume or location in a spatial field of the voice of the at least one of the plurality of participants during the teleconference based on the user frequency models of the plurality of participants to avoid the speech collision.

\* \* \* \* \*